(12) United States Patent
Verheyden et al.

(10) Patent No.: US 9,150,338 B2
(45) Date of Patent: Oct. 6, 2015

(54) LOCKING SYSTEM FOR ENCLOSURES

(75) Inventors: Danny Willy August Verheyden, Gelrode (BE); Roel Modest Willy Bryon, Aarschot (BE); Kristof Vastmans, Boutersem (BE); Geert Van Genechten, Vorselaar (BE)

(73) Assignee: Tyco Electronics Raychem BVBA (BE)

( * ) Notice: Subject to any disclaimer, the term of this patent is extended or adjusted under 35 U.S.C. 154(b) by 0 days.

(21) Appl. No.: 14/116,655

(22) PCT Filed: May 9, 2012

(86) PCT No.: PCT/EP2012/058517
§ 371 (c)(1),
(2), (4) Date: Nov. 8, 2013

(87) PCT Pub. No.: WO2012/152819
PCT Pub. Date: Nov. 15, 2012

(65) Prior Publication Data
US 2014/0061194 A1     Mar. 6, 2014

(30) Foreign Application Priority Data

May 10, 2011   (EP) ...................................... 1165515

(51) Int. Cl.
*B65D 55/14*   (2006.01)
*H02G 3/14*    (2006.01)
(Continued)

(52) U.S. Cl.
CPC .............. *B65D 50/00* (2013.01); *E05B 65/006* (2013.01); *E05C 1/02* (2013.01); *E05C 19/002* (2013.01); *H02G 3/10* (2013.01); *H02G 3/14* (2013.01); *H04Q 1/025* (2013.01)

(58) Field of Classification Search
CPC ...... A01B 12/006; H02G 3/14; E05B 65/006; E05C 1/02; E05C 19/002
USPC .................. 220/3.8, 4.02, 210, 323, 325, 324
See application file for complete search history.

(56) References Cited

U.S. PATENT DOCUMENTS 515,762 A     3/1894   Gaynor
1,902,731 A * 3/1933   Warren ........................... 70/169
(Continued)

FOREIGN PATENT DOCUMENTS

DE       900 864      1/1954
DE      86 02 314     6/1986
(Continued)

OTHER PUBLICATIONS

International Search Report for International Application No. PCT/EP2012/058517 mailed Nov. 2, 2012 (3 pages).

*Primary Examiner* — Robert J Hicks
*Assistant Examiner* — Niki Eloshway
(74) *Attorney, Agent, or Firm* — Merchant & Gould P.C.

(57) ABSTRACT

A locking system for an enclosure (10) wherein the enclosure (10) includes a base (12) and a moveable cover (14). The cover (14) is moveable only when a key operated slide (70) is moved by a key (26) inserted into a key slot (24). Once the cover (14) is moved, the key (26) cannot be removed from the key slot (24) until the cover (14) is returned to the closed positioned. A moveable latch (50) holds the cover (14) to the base (12). The key operated slide (70) selectively connects and disconnects from the latch (50) to allow the cover (14) to be moved. The latch (50) cooperates with a clip (94) on the slide (70) which allows the slide (70) to return to the locked position to allow the key (26) to be removed from the key slot (24) only when the cover (14) and the latch (50) are closed. One or two latches can be provided with a corresponding number of key operated slides (70). The key (26) is rotatable to move the slide (70) from an extended and locked position to a retracted and unlocked position.

8 Claims, 21 Drawing Sheets

(51) Int. Cl.
  *B65D 50/00* (2006.01)
  *H04Q 1/02* (2006.01)
  *H02G 3/10* (2006.01)
  *E05B 65/00* (2006.01)
  *E05C 1/02* (2006.01)
  *E05C 19/00* (2006.01)

(56) References Cited

U.S. PATENT DOCUMENTS

| | | |
|---|---|---|
| 2,585,919 A | 3/1945 | Davis |
| 4,409,806 A | 10/1983 | Propst |
| 4,548,330 A * | 10/1985 | Hewitt et al. ............ 220/210 |
| 5,255,811 A * | 10/1993 | Simon ............................ 119/265 |
| 5,291,766 A | 3/1994 | Eisermann |
| 5,884,511 A | 3/1999 | Preddey |
| 6,073,792 A * | 6/2000 | Campbell et al. ............ 220/284 |
| 6,142,595 A | 11/2000 | Dellapi et al. |
| 7,080,533 B2 | 7/2006 | Sedley |
| 7,131,301 B1 | 11/2006 | Chang |
| 7,565,999 B1 * | 7/2009 | Jensen ............................ 232/44 |
| 7,569,777 B1 * | 8/2009 | Gillam ............................ 174/562 |
| 8,136,377 B2 | 3/2012 | Yang |
| 8,763,836 B2 * | 7/2014 | Becklin ............................ 220/210 |
| 2003/0127458 A1 * | 7/2003 | Dushane et al. ............ 220/241 |
| 2004/0094319 A1 | 5/2004 | Koessler |
| 2008/0202178 A1 | 8/2008 | Lanz et al. |
| 2009/0256676 A1 | 10/2009 | Piccirillo et al. |

FOREIGN PATENT DOCUMENTS

| | | |
|---|---|---|
| DE | 198 13 257 | 2/1999 |
| EP | 1 231 492 | 8/2002 |
| EP | 2 282 385 | 2/2011 |
| FR | 2 911 358 | 7/2008 |
| JP | 2003-348728 | 12/2003 |
| KR | 10-2010-0011683 | 12/2010 |
| WO | WO 2010/055451 | 5/2010 |
| WO | WO 2012/154577 | 11/2012 |
| WO | WO 2013/000821 | 1/2013 |

* cited by examiner

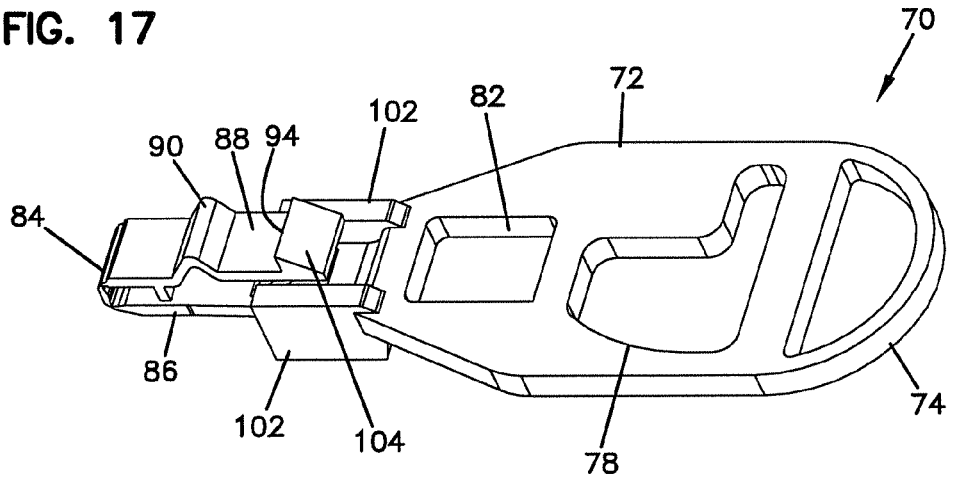
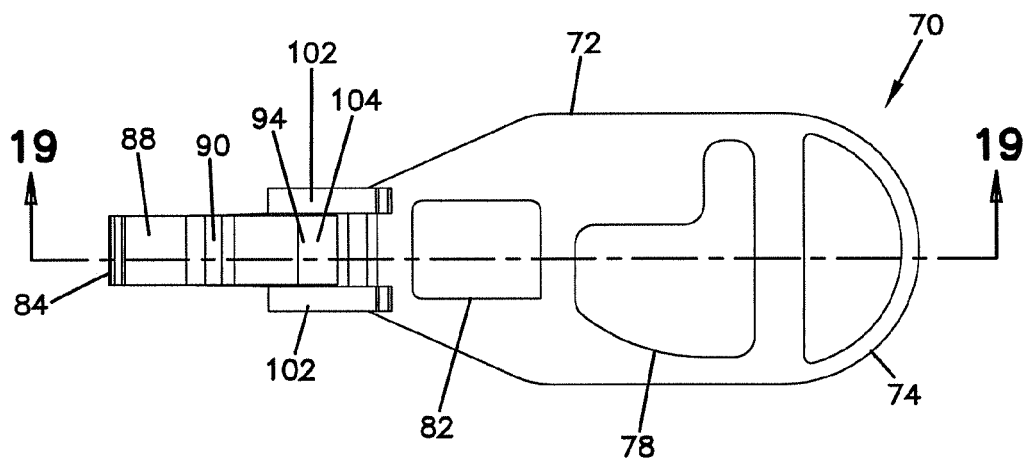
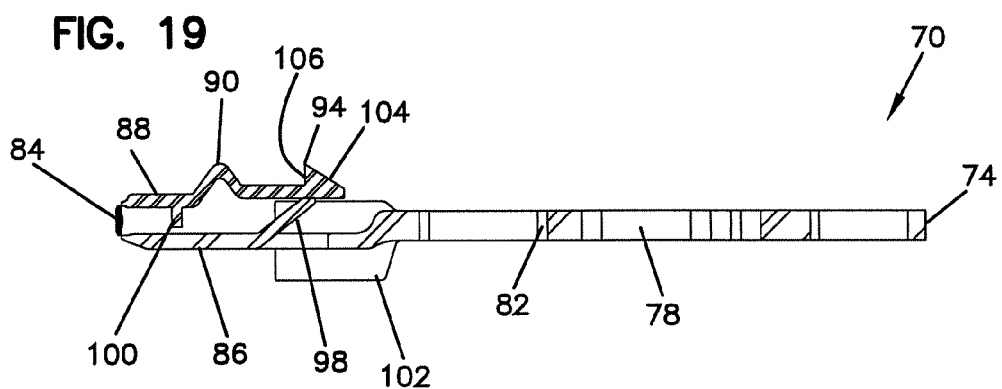

LOCKING SYSTEM FOR ENCLOSURES

This application is a National Stage Application of PCT/EP2012/058517, filed 9 May 2012, which claims benefit of Ser. No. 11165515.5, filed 10 May 2011 in Europe and which applications are incorporated herein by reference. To the extent appropriate, a claim of priority is made to each of the above disclosed applications.

FIELD OF THE INVENTION

The present invention relates to systems and methods for locking telecommunications enclosures.

BACKGROUND OF THE INVENTION

Enclosures are known for managing telecommunications cables and connectivity equipment, including splices, splitters, wave division multiplexers and termination. The enclosures may be mounted outside and include movable covers for accessing an interior of the enclosures. There is a need for maintaining the covers in the closed positions. There is also a need for providing limited access to the interiors, such as with a security feature.

SUMMARY OF THE INVENTION

The present invention concerns a locking system for an enclosure wherein the enclosure includes a base, and a moveable cover. The cover is moveable only when a key operated lock is moved by a key inserted into a key hole and rotated to operate the lock. Once the cover is moved, the key cannot be turned and/or removed from the key slot until the cover is returned to the closed position.

In one embodiment, a moveable slide operated by the key holds the cover to the base.

In one embodiment, the moveable slide moves between an extended and locked position to a retracted and unlocked position.

In a further embodiment, a moveable latch holds the cover to the base in the closed position. The key operated slide selectively connects and disconnects from the latch to allow the cover to be moved.

In one embodiment, the latch operates a clip or latching element on the key operated slide which allows the slide to return to the locked position to allow the key to be turned and removed from the key slot only when the cover and the latch are in the closed positions.

In one embodiment, two latches are provided on opposite sides of the enclosure, and two key operated slides are provided, one for cooperating with each latch.

The invention also relates to a lock operated by a rotatable key, wherein the lock includes a moveable member moved by the key. The key cannot be removed or rotated back to a locked condition until a moveable clip of the lock is moved to allow movement of the moveable member.

The invention also relates to a method of using a lock of an enclosure, wherein a key is rotated to move a moveable member allowing a cover to be moved relative to a base to access an interior of the enclosure. The key cannot be removed or rotated back to a locked condition until the cover is closed.

In one preferred method, the lock includes a moveable slide moveable from an extended position to a retracted position to unlock the cover.

In one preferred method, the moveable slide includes a clip which latches the slide in the retracted position. The clip is moveable by engagement with the cover, or a moveable latch which holds the cover, when the cover and/or latch are in the closed position; to allow the lock to be returned to the locked condition and the key to be removed.

BRIEF DESCRIPTION OF THE FIGURES

FIG. 17 is a perspective view of one of the slides of the lock;

FIG. 18 is a top view of the slide of FIG. 17;

FIG. 19 is a cross-sectional view of the slide of FIG. 18 along lines 19-19;

DETAILED DESCRIPTION

Figure 1:
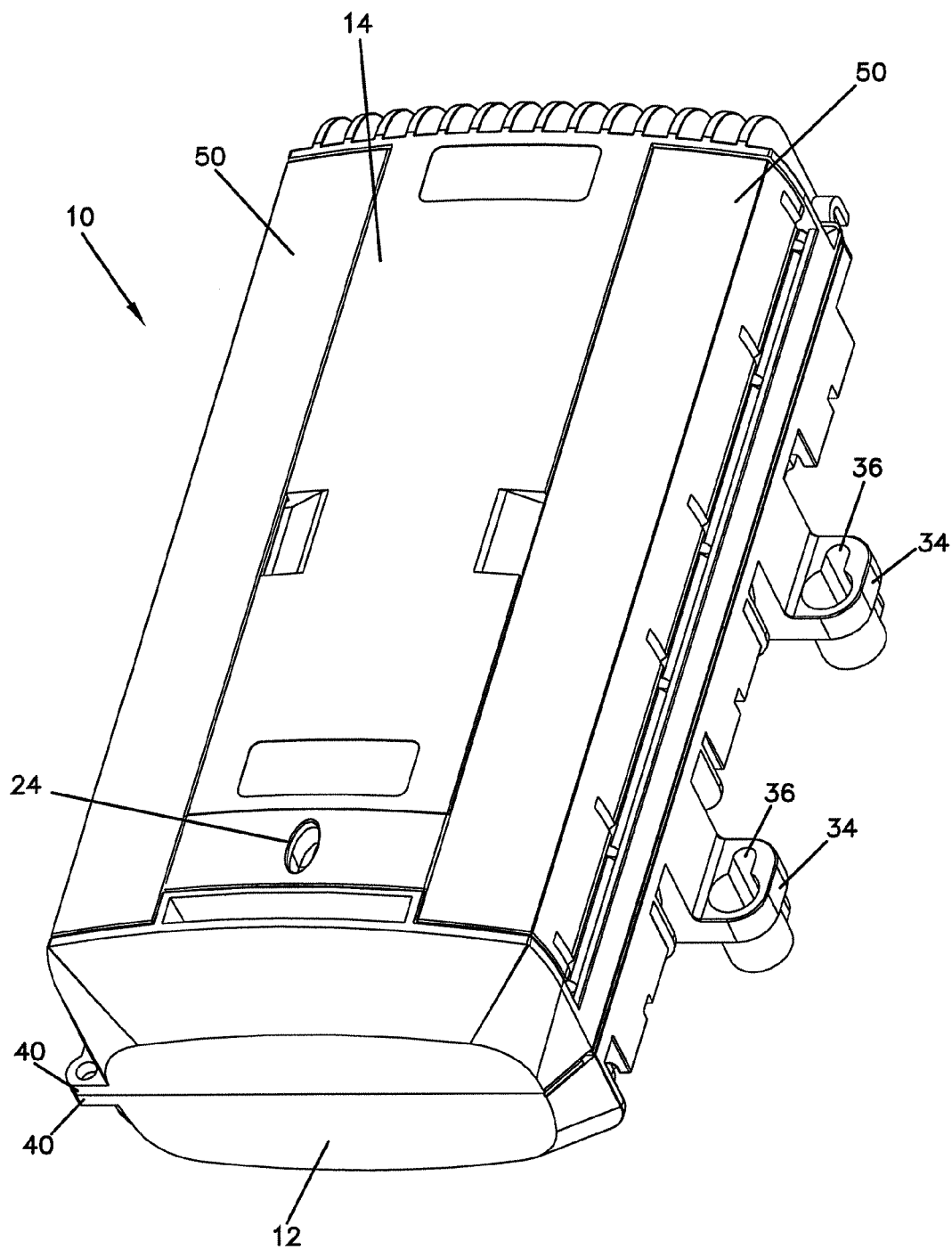
FIG. 1 is a perspective view of a telecommunications enclosure in accordance with one embodiment of the invention, in the closed position.
Figure 2:
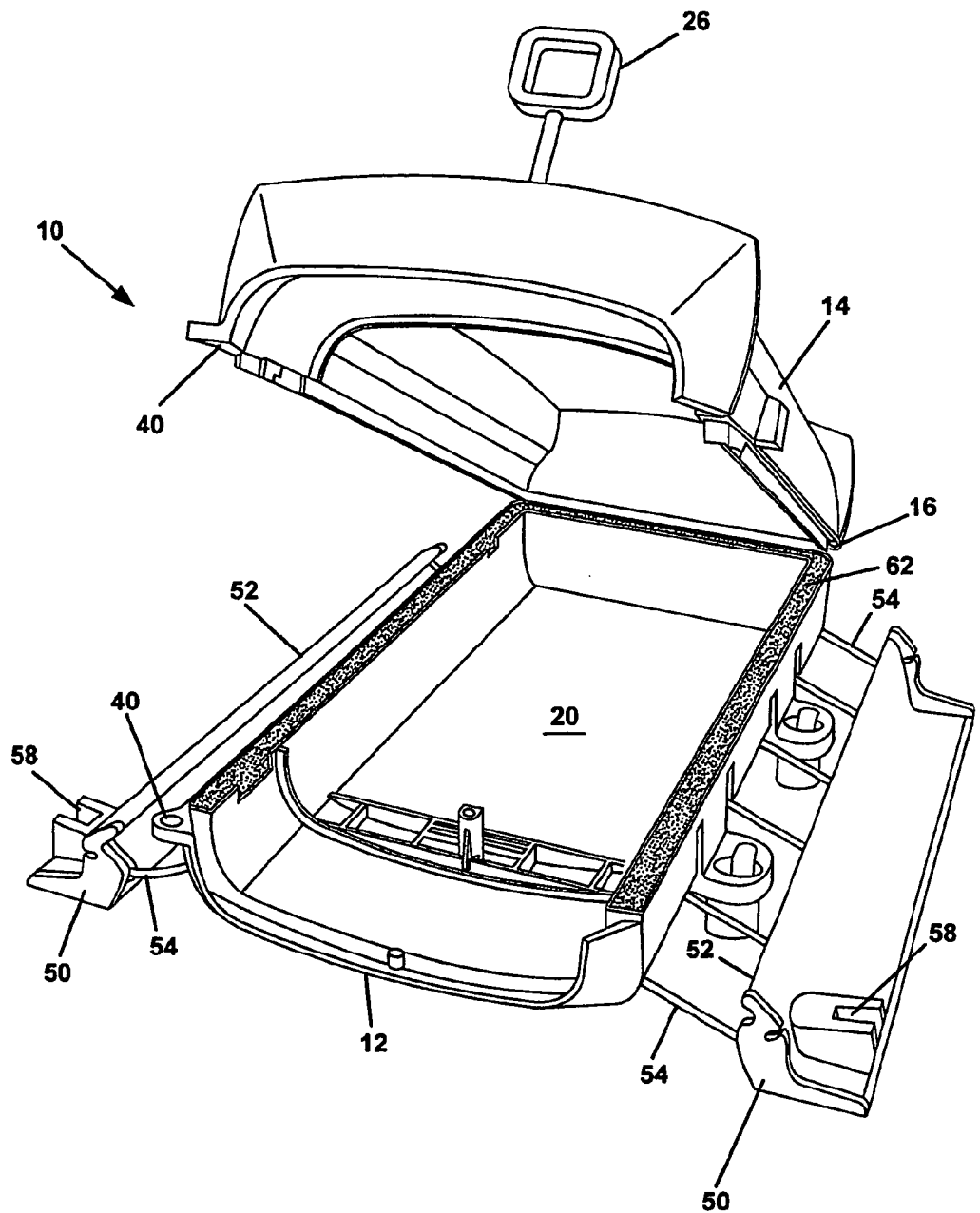
FIG. 2 is a perspective view of the enclosure of FIG. 1, showing the cover in the open position, with end portions removed.
Figure 3:
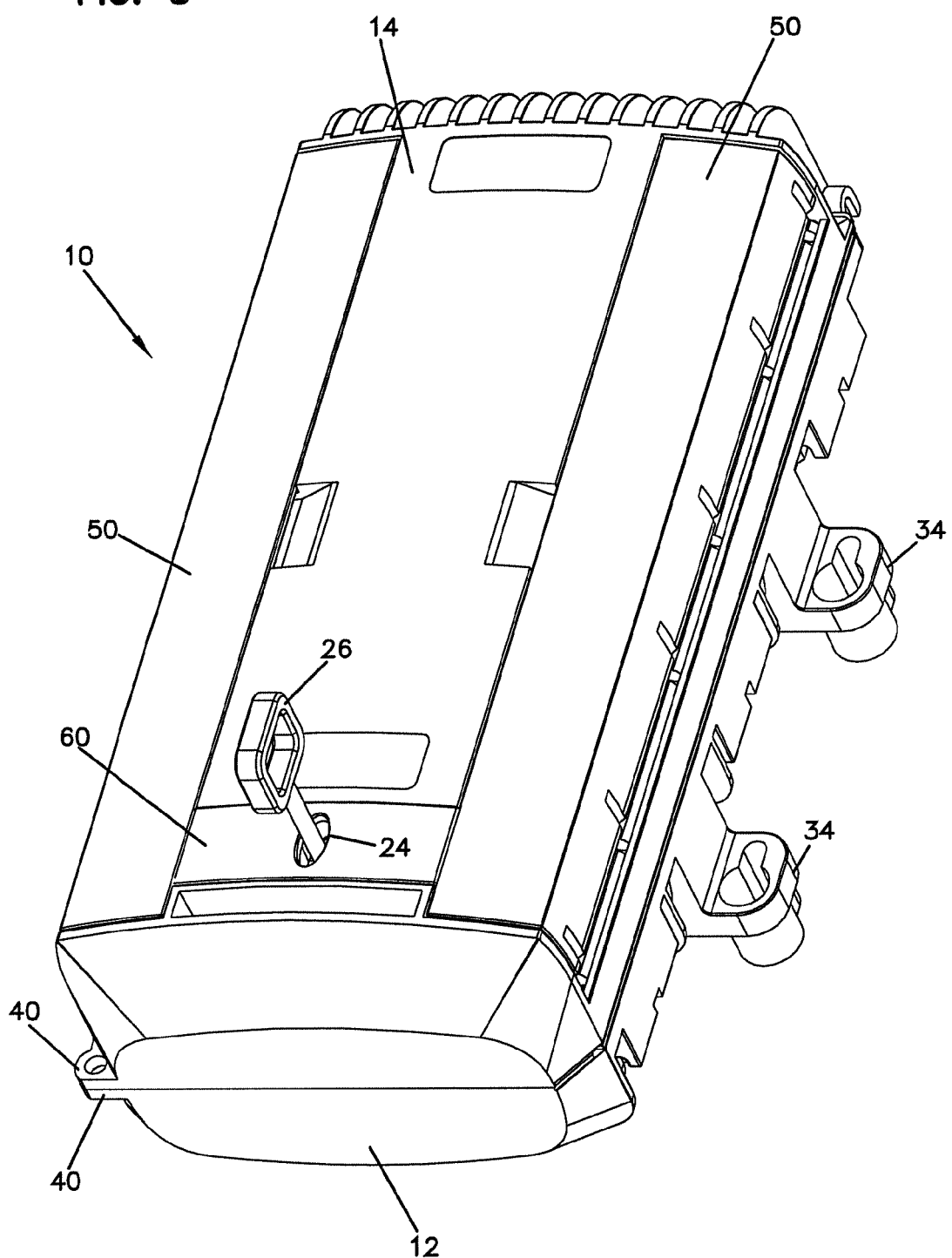
FIG. 3 is a perspective view of the enclosure of FIG. 1, showing the key inserted into the key hole.
Figure 4:
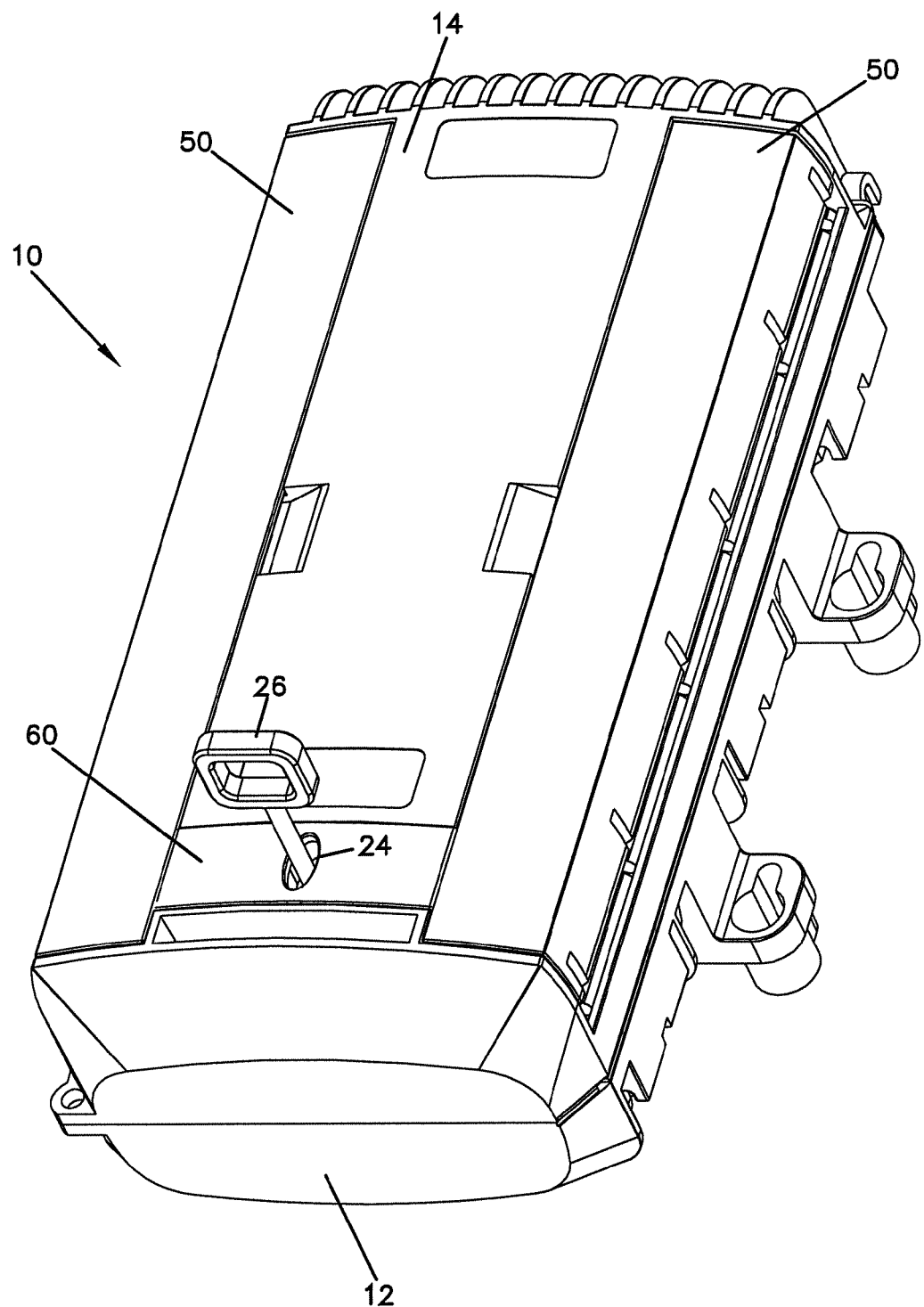
FIG. 4 is a perspective view of the enclosure of FIG. 3, showing the key turned 90 degrees to unlock the lock.
Figure 5:
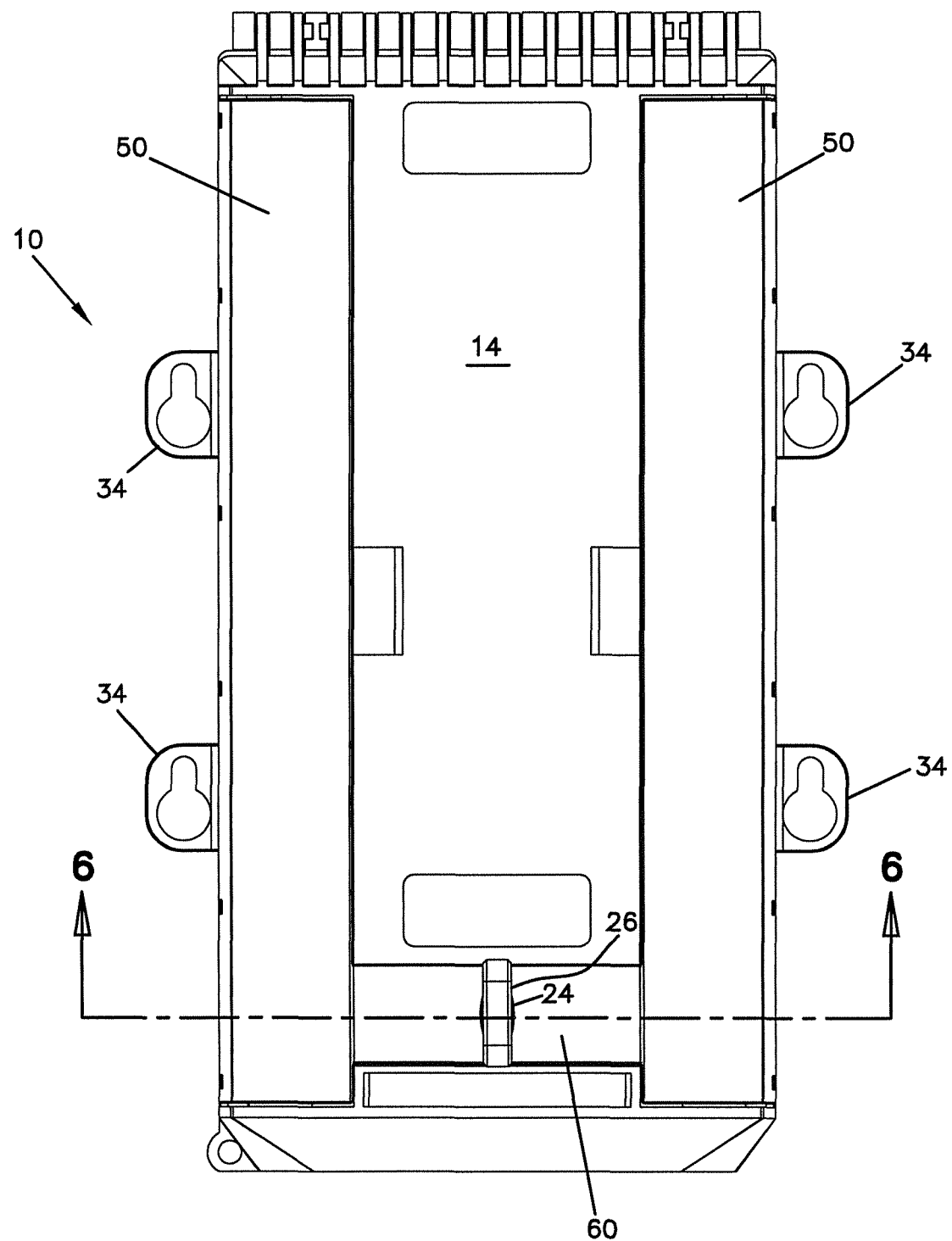
FIG. 5 is a top view of the enclosure of FIG. 3.
Figure 6:
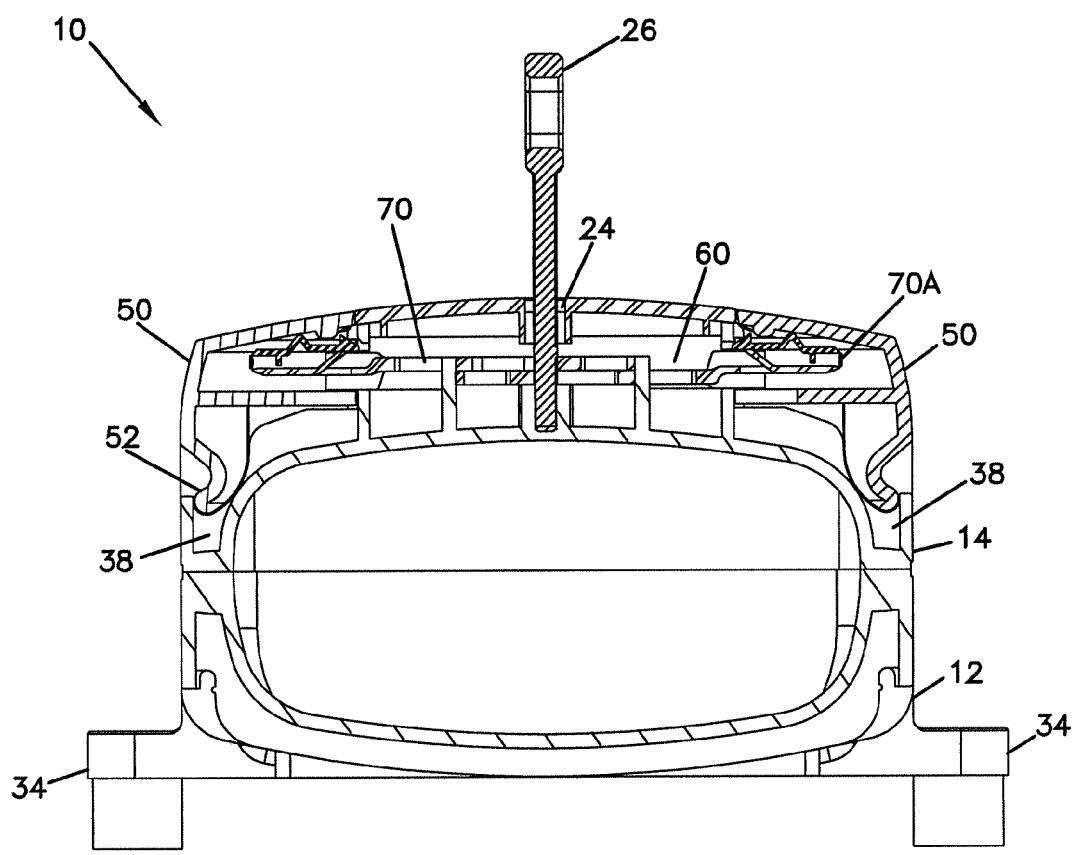
FIG. 6 is a cross-sectional view of the enclosure of FIG. 5 along lines 6-6
Figure 7:
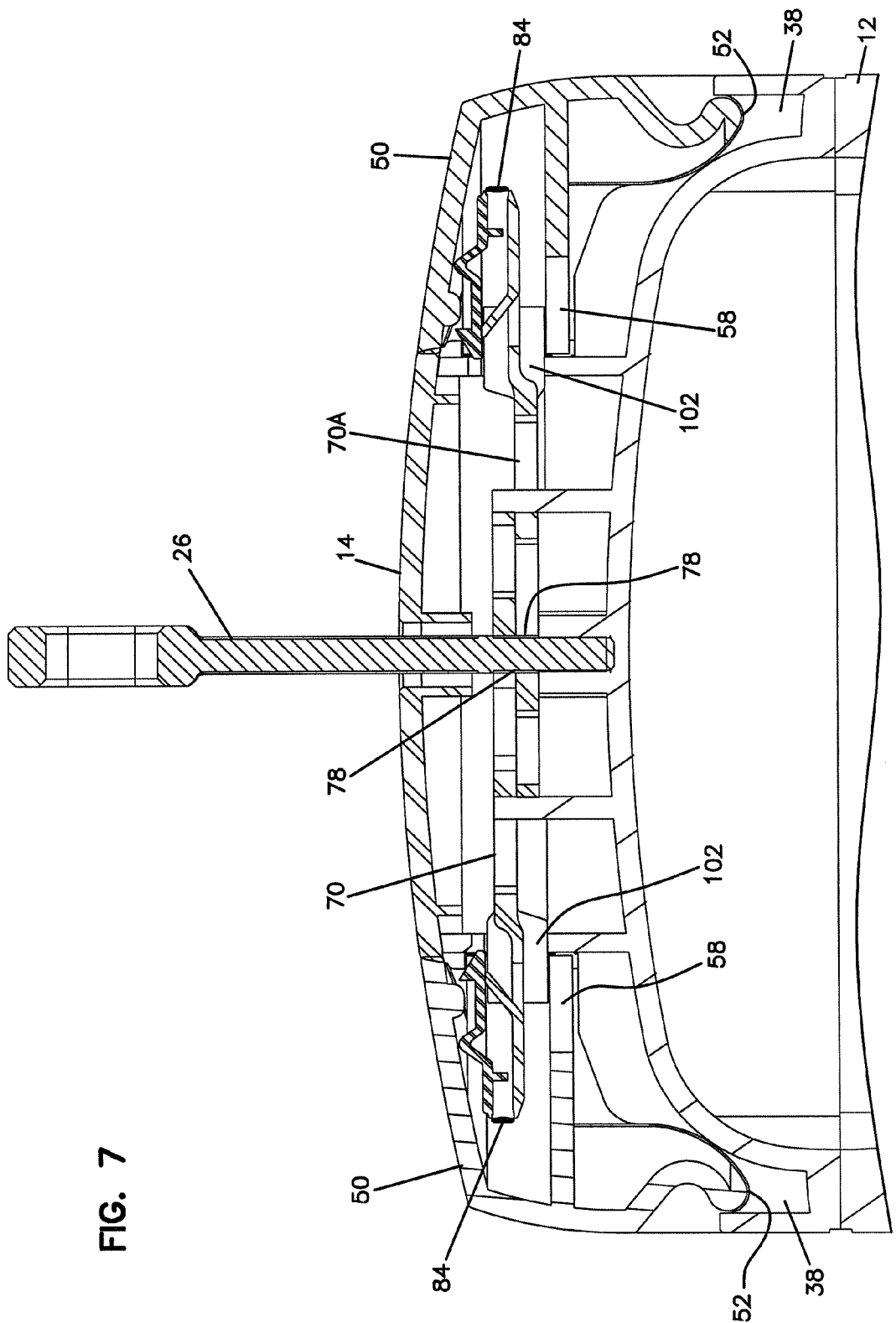
FIG. 7 is an enlarged view of a portion of the cross-sectional view of FIG. 6.
Figure 8:
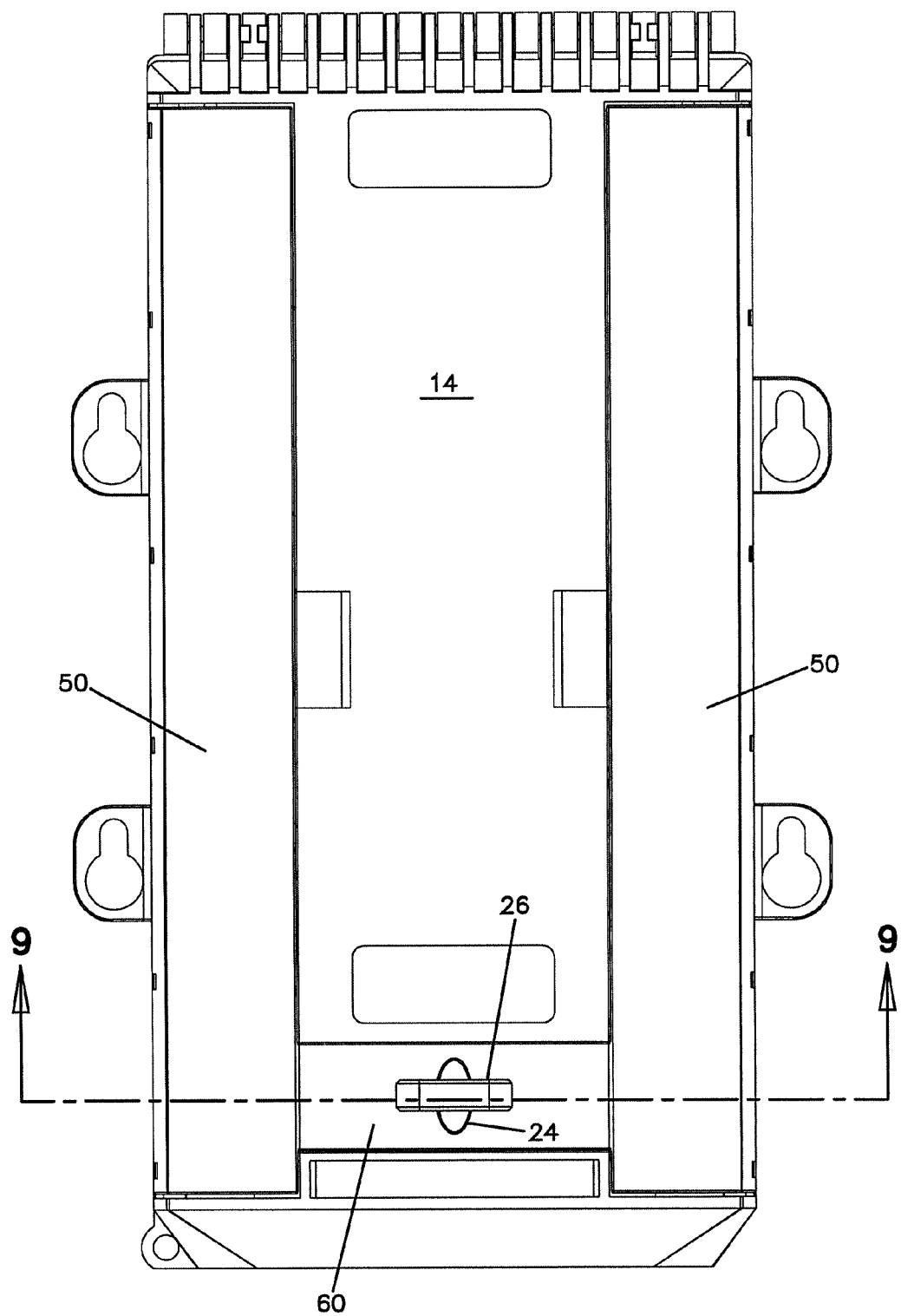
FIG. 8 is a top view of the enclosure of FIG. 4.
Figure 9:
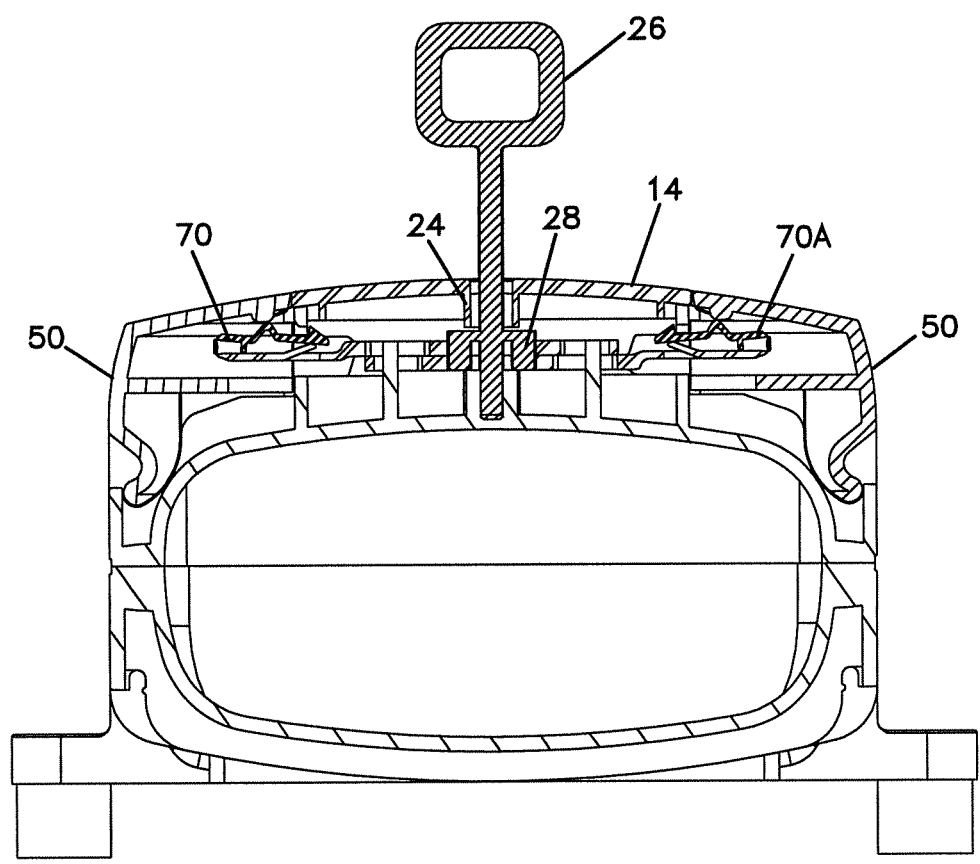
FIG. 9 is a cross-sectional view of the enclosure of FIG. 8 along lines 9-9.

Referring now to FIGS. 1-4, a telecommunications enclosure 10 is shown including a base 12, and a moveable cover 14. In one embodiment, base 12 is the bottom element, and cover 14 is the top element. Cover 14 is hinged at a hinge 16 to expose an interior 20 for holding telecommunications cables and connectivity equipment, including splices, splitters, wave division multiplexers, and terminations. Cover 14 includes a key hole 24 related to an interior lock 60 that will be described in greater detail below. Key hole 24 has an elongated shape. A key 26 has an end 30 (see FIG. 10) which operates the lock 60 through rotating movement. Key 26 can only be inserted and removed in certain orientations relative to key hole 24.

Base 12 includes tabs 34 with holes 36 for mounting enclosure 10 to a pole or wall structure. Base 12 and cover 14 each include an eyelet 40 for use with a security tie or lock for additional security in addition to lock 60 if desired.

Enclosure 10 includes latches 50 which are moveable relative to base 12 and cover 14 to allow cover 14 to rotate or move relative to base 12. Latches 50 extend generally the full length of enclosure 10 in the longitudinal direction. Latches 50 include hooks 52 which are received in slots 38 of cover 14. Flexible elements 54 connect latches 50 to base 12.

Lock 60 releaseably closes latches 50 and cover 14 to base 12. Lock 60 engages sockets 58 on latches 50 to retain latches 50 in the position shown in FIG. 1 to maintain enclosure 10 in the closed condition. In one preferred embodiment, a water tight seal 62 is positioned between base 12 and cover 14.

Figure 10:
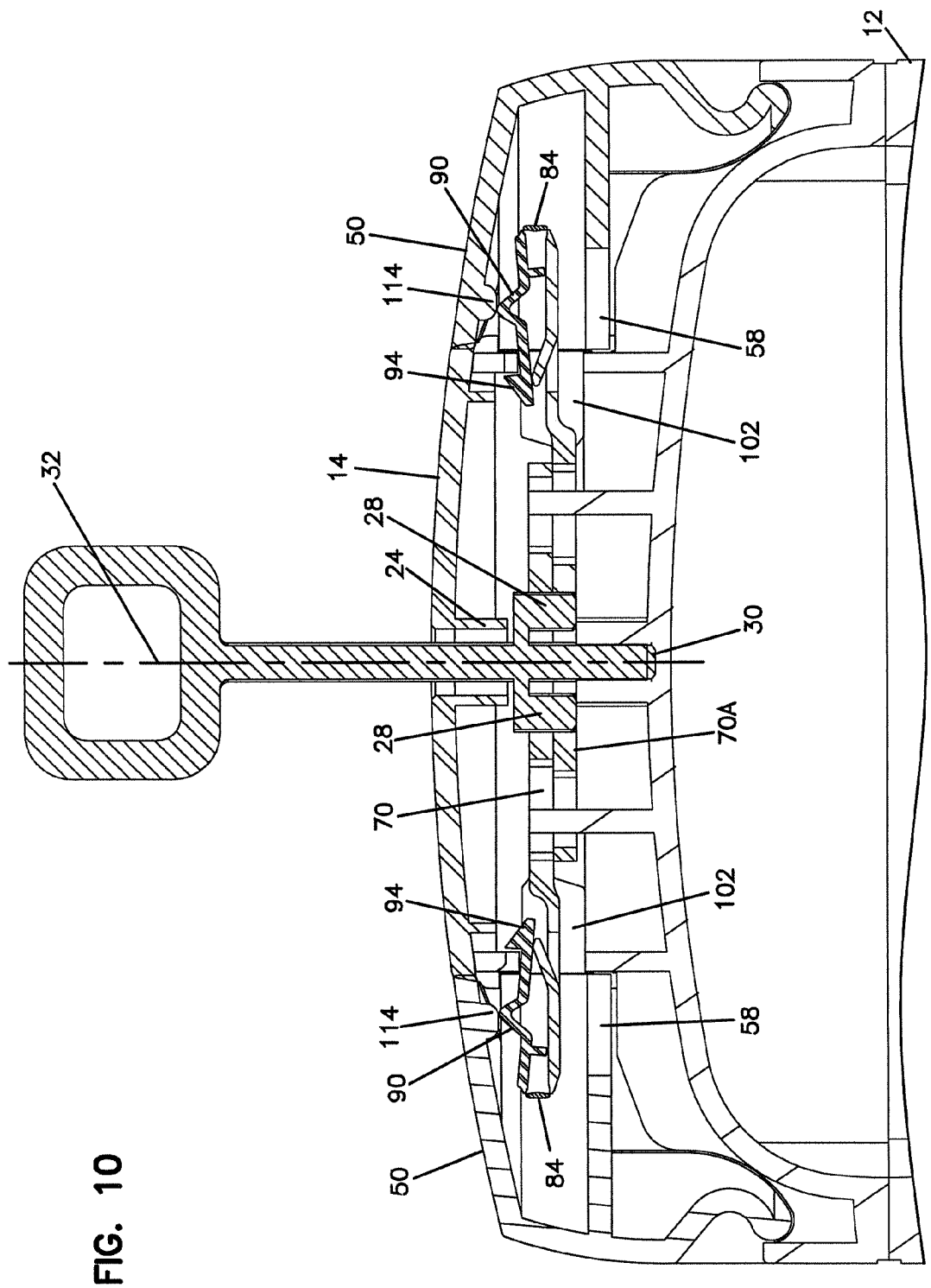
FIG. 10 is an enlarged view of a portion of the cross-sectional view of FIG. 9.
Figure 11:
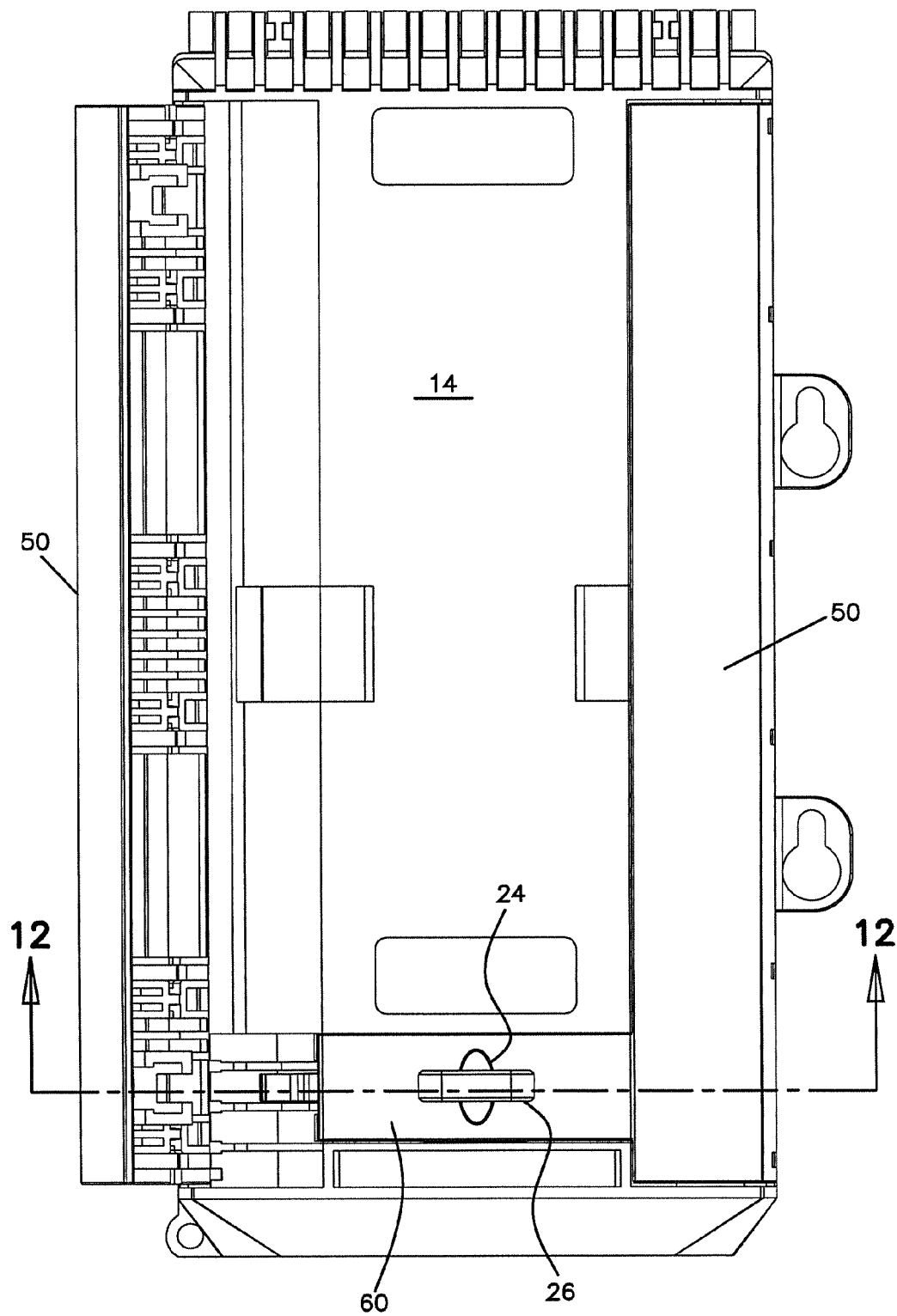
FIG. 11 is a top view of the enclosure of FIG. 4, showing one of the latches in the open position.
Figure 12:
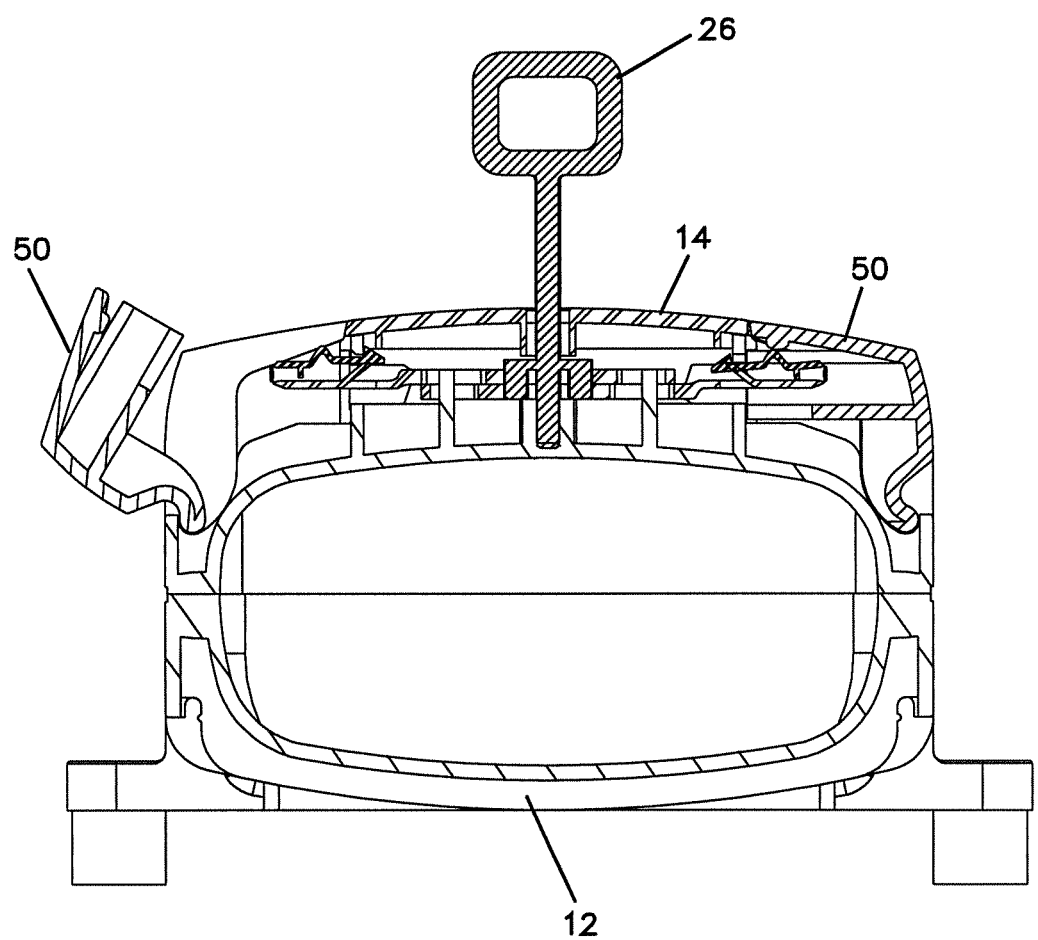
FIG. 12 is a cross-sectional view of the enclosure of FIG. 11 along lines 12-12.

Referring now to FIGS. 5-23, lock 60 will be described in greater detail. Lock 60 includes at least one moveable slide 70. In the illustrated embodiment, two slides 70, 70A are provided. Slide 70A is similarly constructed to slide 70. Each slide 70, 70A cooperates with one of the two latches 50 by engaging and disengaging the respective socket 58 on each latch 50. As shown in FIG. 10, key 26 includes lever arms 28 on end 30. Rotation of key 26 about axis 32 causes movement of slides 70 between extended (closed) and retracted (open) positions.

Referring now to FIGS. 17-19, slide 70 includes a body 72 including a spring 74 formed by a flexible strip, a cam opening 78 for receipt of the key 26, and a spring post opening 82. A latch end 84 of slide 70 includes a base 86 and a flexible tab 88. Flexible tab 88 includes an upper bump 90, and a distal snap or clip 94. Clip 94 includes a ramp 104, and a shoulder 106. Base 86 includes a spring arm 98. Tab 88 includes a lower stop 100. Body 72 of slide 70 also includes two side lock plates 102 which cooperate with sockets 58 of latches 50 to hold latches 50 in the closed positions. Slide 70A is similarly constructed, to operate in the opposite direction. Slides 70, 70A operate simultaneously.

Referring now to FIGS. 7, 10, 13, 16, and 20-23, upper slide 70 is positioned above lower slide 70A in overlapping relation. When key is turned 90 degrees clockwise from the position shown in FIGS. 20 and 21 to the position shown in FIGS. 22 and 23, lever arms 28 engage cam openings 78 to retract or pull latch ends 84 inwardly. Such movement causes lock plates 102 to disengage from sockets 58. Compare FIGS. 7 and 10.

Figure 22:
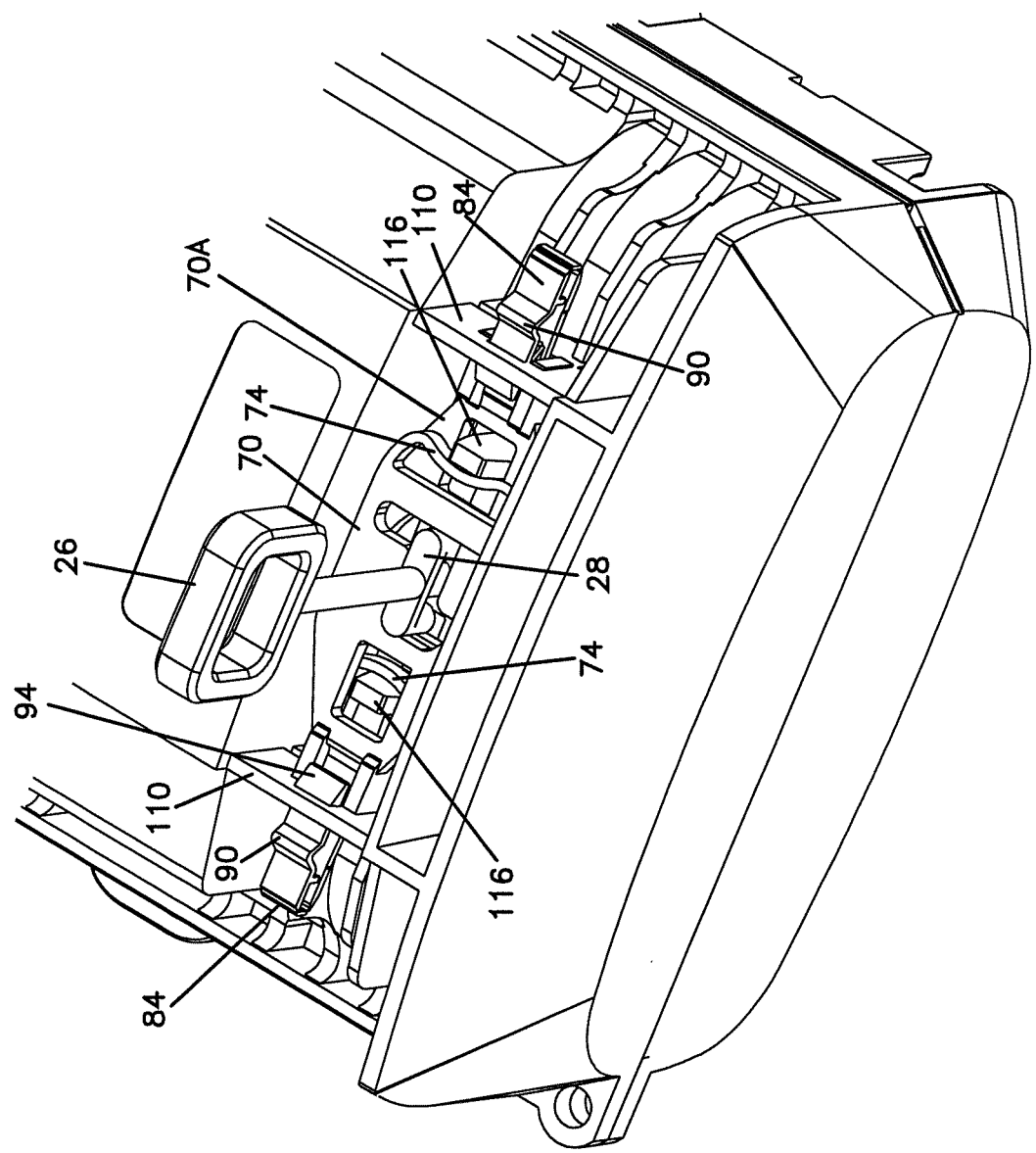
FIG. 22 is a perspective view of a portion of the enclosure of FIG. 4, with portions removed to illustrate the lock.
Figure 23:
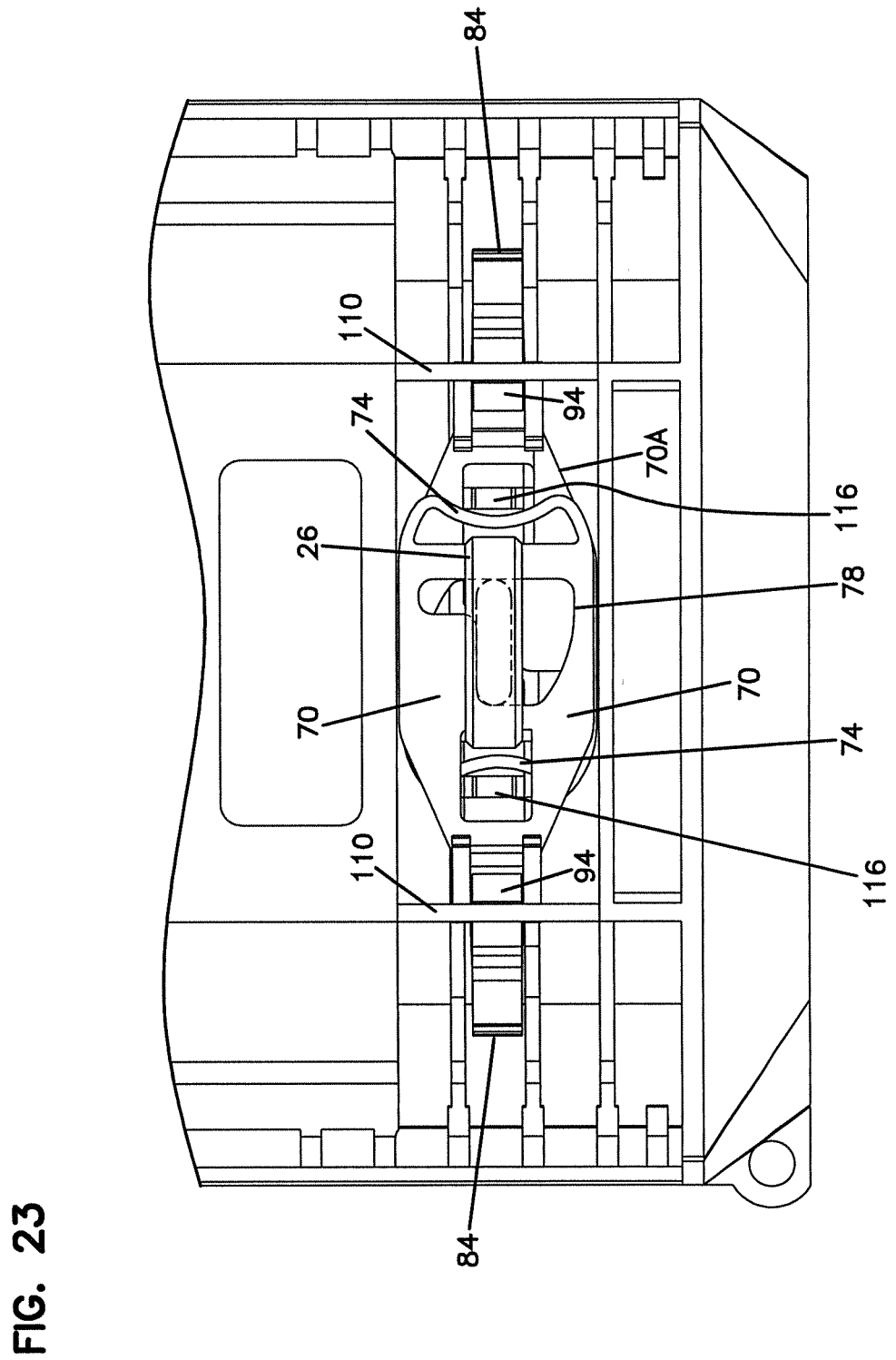
FIG. 23 is a top view of the view of the enclosure of FIG. 22.

In the position of FIG. 22, ramps 104 of clips 94 slide through openings 112 in plate portions 110. Once latches 50 are lifted, the shoulders 106 are retained by plate portions 110 so that key 26 cannot be rotated from the position of FIG. 22 to the position of FIG. 20. See FIGS. 13 and 16. When the latches 50 are in the open position, slides 70, 70A cannot be moved from the retracted positions to the extended positions. Once the latches 50 are closed, bumps 114 on latches 50 engage bumps 90 on slides 70, 70A to push clips 94 downwardly so that clips 94 can clear the openings 112 in plate portions 110 allowing key 26 to be rotated back to the locked position, and moving slides 70, 70A from the retracted positions to the extended positions.

Spring arm 98 biases tab 88 upwardly. Stop 100 limits the amount of travel of tab 88 downwardly. Spring post 116 provides a stop surface for engagement by spring 74 of each slide 70A, 70B, respectively.

Figure 13:
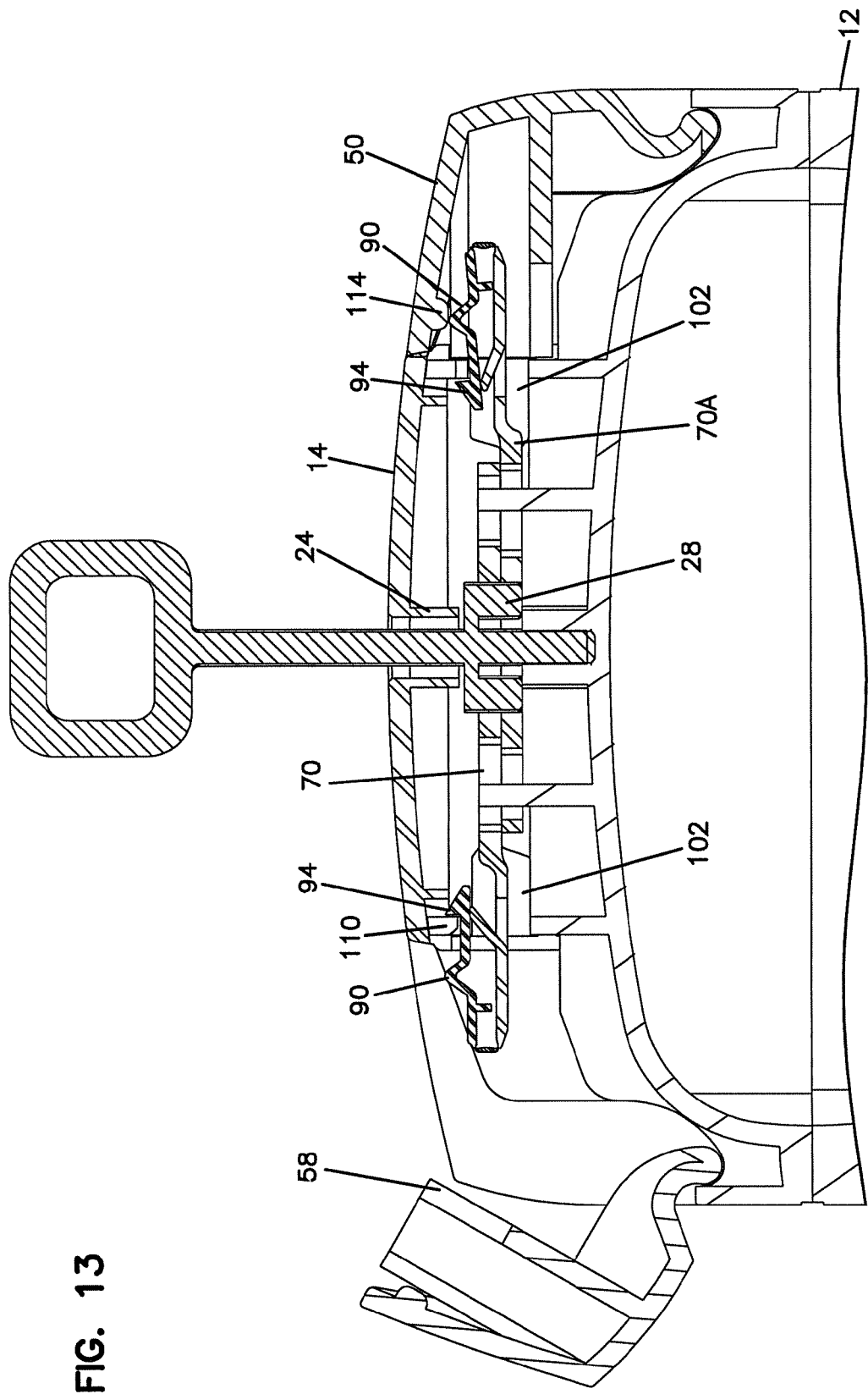
FIG. 13 is an enlarged view of a portion of the cross-sectional view of FIG. 12.
Figure 14:
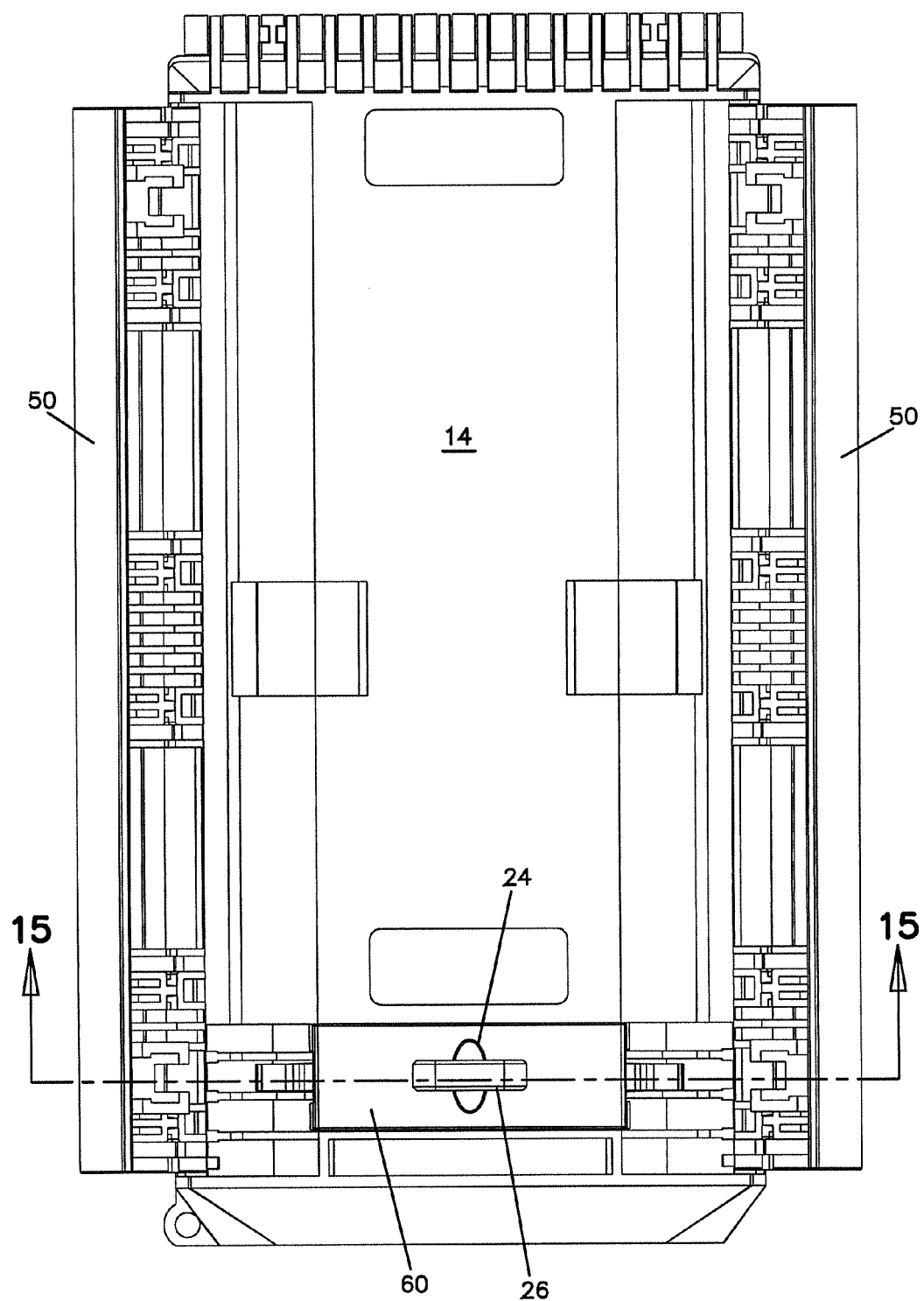
FIG. 14 is a top view of the enclosure of FIG. 4, showing both latches in the open position.
Figure 15:
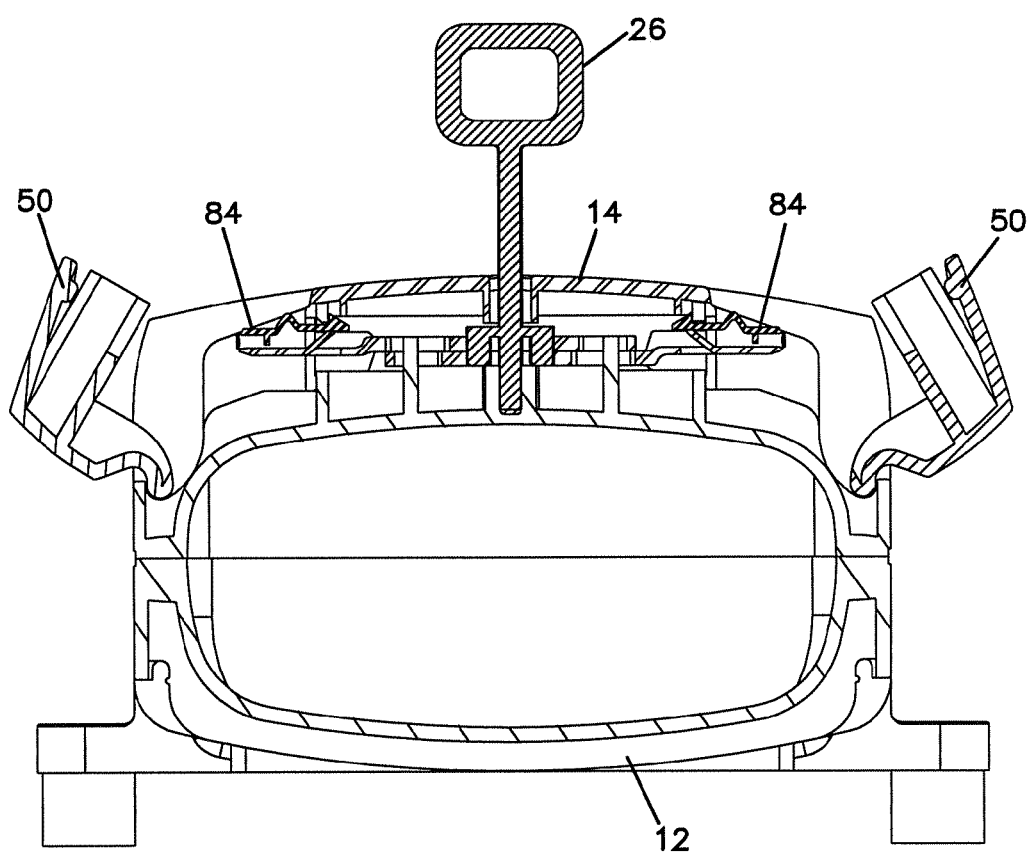
FIG. 15 is a cross-sectional view of the enclosure of FIG. 14 along lines 15-15.
Figure 16:
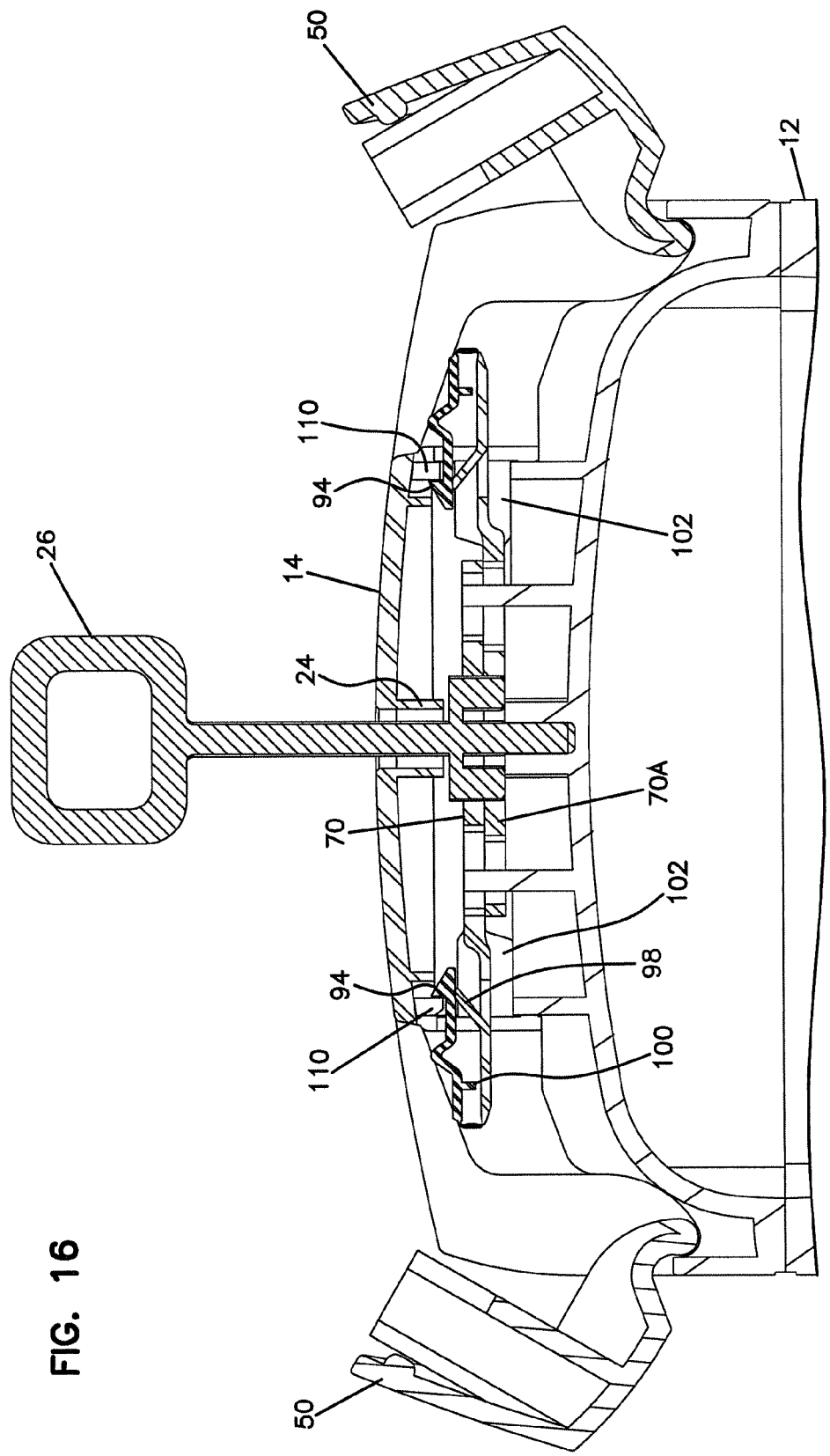
FIG. 16 is an enlarged view of a portion of the cross-sectional view of FIG. 15.
Figure 20:
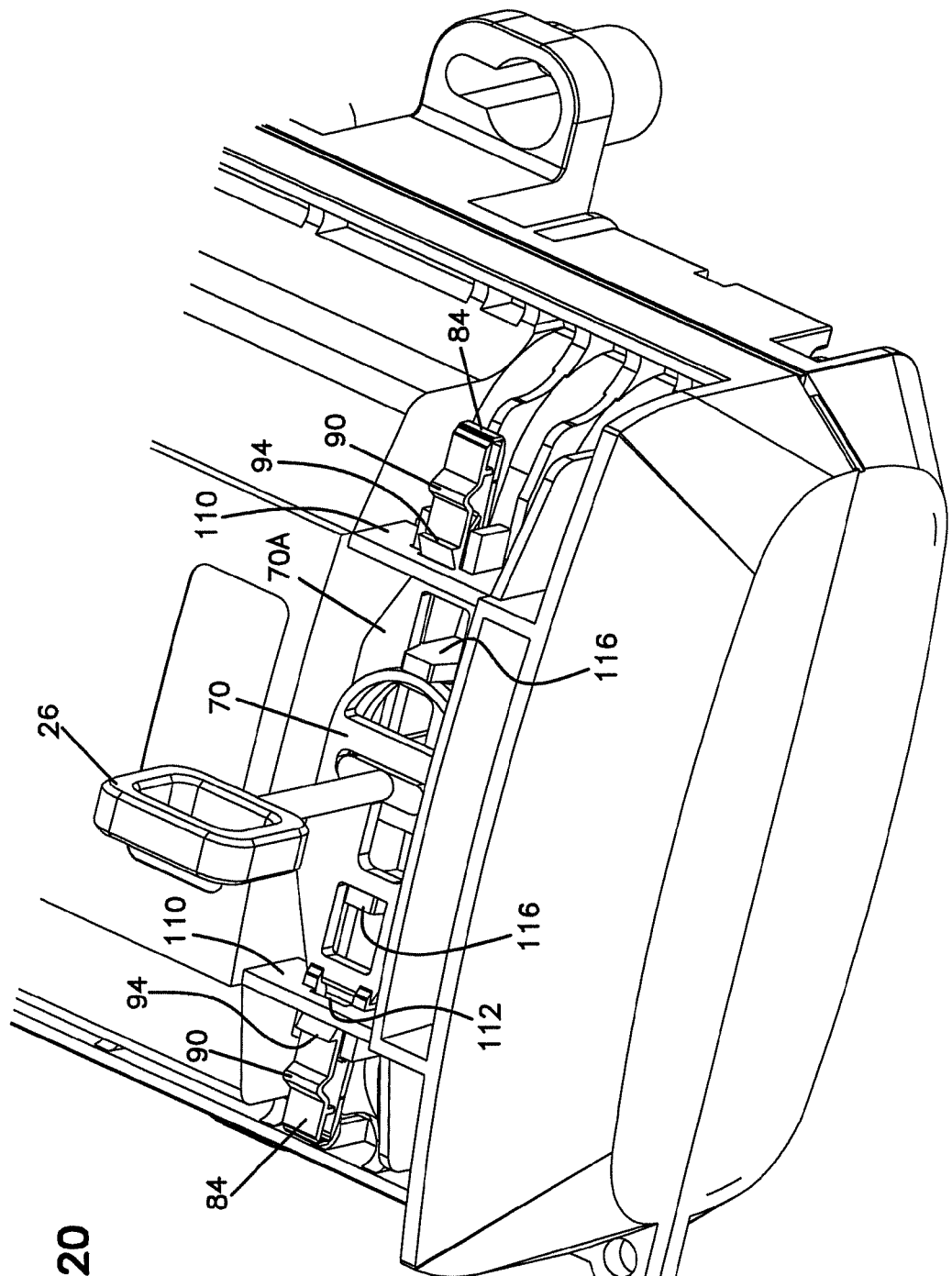
FIG. 20 is a perspective view of a portion of the enclosure of FIG. 3, with portions removed to illustrate the lock.
Figure 21:
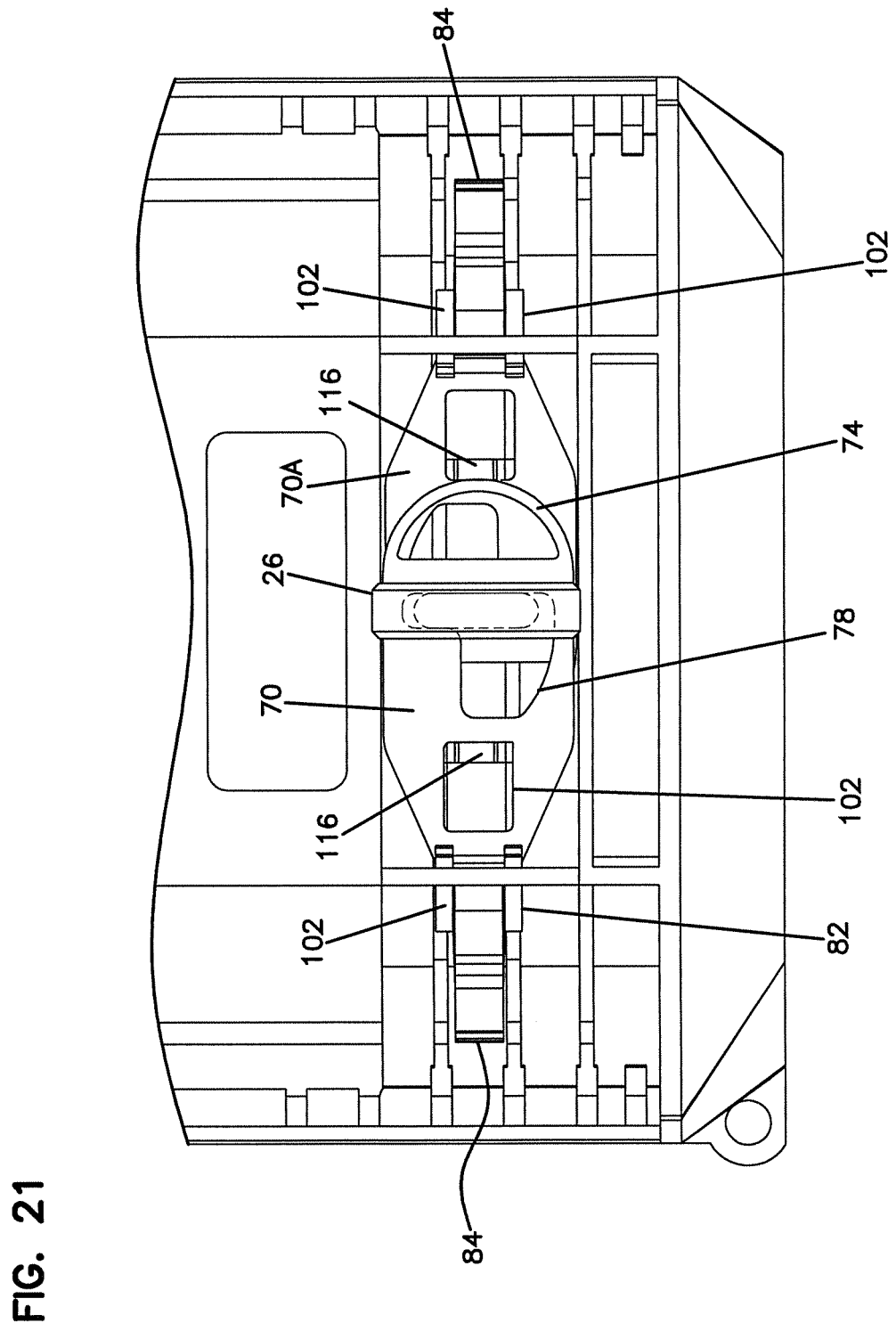
FIG. 21 is a top view of the view of the enclosure of FIG. 20.

As shown in FIGS. 10, 13 and 16, lever arms 28 of key 26 are wider than key hole 24, preventing key 26 from being removed from lock 60 unless both latches 50 are closed, and both slides 70, 70A are pushed outwardly to the extended positions.

As described, a rotatable key 26 is used with a lock 60 to open an enclosure 10 through rotational movement, and the key 26 cannot be removed and/or rotated back until the enclosure is closed again. Such a system prevents an operator from leaving an enclosure open exposed to the elements or to unauthorized persons from later accessing the internal contents of the enclosure.

One further feature to include for tracking of the operator's use of key 26 is to add RFID (Radio Frequency Identification) technology to key 26 and lock 60 which can record times, dates, and which enclosures 10 were accessed by the operator during the working shift or shifts. The key 26 will retain the usage data, and can be turned in at a reporting station to record and download the usage data.

Parts List
10 Enclosure
12 Base (bottom)
14 Cover (top)
16 Hinge
20 Interior
24 Key hole
26 Key
28 Lever arms
30 Shaft end
32 Axis
34 Tabs
36 Holes
38 Slots
40 Eyelets
50 Latches
52 Hooks
54 Flexible elements
58 Sockets
60 Lock
62 Seal
70 Slide
70A Bottom slide
72 Body
74 Spring
78 Cam opening
82 Opening for spring tab
84 Latch end
86 Base
88 Tab
90 Bump
94 Clip (snap)
98 Spring arm
100 Stop
102 Lock plate
104 Ramp
106 Shoulder
110 Plate portion
112 Opening
114 Bump
116 Spring post

What is claimed is:

1. A telecommunications enclosure and lock combination comprising:
a base;
a moveable cover, wherein the base and the cover define an enclosed interior, wherein the cover is moveable to access the interior;
a lock for receiving a rotatable key for locking the enclosure closed;
wherein
the lock includes a slide operated by the key and moveable between an extended position and a retracted position;

wherein in the extended position the cover is locked to the base, and wherein in the retracted position the cover is moveable relative to the base;

wherein the slide cannot be moved from the retracted position to the extended position until the cover is in the closed position relative to the base, and wherein the key cannot be removed from the lock when the slide is in the retracted position;

wherein the slide includes a clip for retaining the slide in the retracted position as long as the cover is in the open position.

2. The telecommunications enclosure and lock combination of claim 1, further comprising a latch which is moveable relative to the base and the cover, wherein the slide engages the latch to hold the latch in a closed position which holds the cover in the closed position relative to the base.

3. The telecommunication enclosure and lock combination of claim 2, wherein two latches are provided on opposite sides of the cover, and two slides are provided with the lock, wherein the key operates both slides simultaneously.

4. The telecommunication enclosure and lock combination of claim 3, wherein each slide includes a body including a spring, a cam opening.

5. The telecommunications enclosure and lock combination of claim 4, wherein each slide includes an opening for a spring post of the cover.

6. The telecommunications enclosure and lock combination of claim 2, wherein the slide includes a latch end including a base, and a moveable tab which holds the slide in the retracted position when the cover and/or the latches are in the open positions.

7. The telecommunications enclosure and lock combination of claim 6, wherein the tab includes a bump, and a clip with a ramp and a shoulder, wherein the base includes a spring arm, wherein the tab includes a stop, and wherein the cover includes a plate portion with an opening for engagement with the shoulder in the retracted position, wherein the latch includes a socket and a bump, wherein the slide includes a locking plate engageable with the socket of the latch to hold the latch in the closed position in the extended position, wherein the bump of the latch moves the clip of the tab of the slide to allow the slide to move from the retracted position to the extended position.

8. A method of using the lock of the telecommunications enclosure of claim 1, the lock including a slide operated by a rotatable key and moveable between an extended position and a retracted position;

wherein in the extended position the cover is locked to the base, and wherein in the retracted position the cover is moveable relative to the base;

wherein the slide cannot be moved from the retracted position to the extended position until the cover is in the closed position relative to the base, and wherein the key cannot be removed from the lock when the slide is in the retracted position; the method comprising:

rotating the key to move the slide to the retracted position;

opening the cover to access the interior;

closing the cover after accessing the interior;

rotating the key back to move the slide to the extended position;

wherein a clip latches the slide in the retracted position such that the slide cannot be moved from the retracted position to the extended position until the cover is in the closed position relative to the base, and wherein the key cannot be removed from the lock when the slide is in the retracted position; and providing a latch which is moveable relative to the cover, and moving the latch to a closed position when the cover is in the closed position, wherein the latch latches the clip, enabling the key to be rotated to move the slide to the extended position.

* * * * *